United States Patent
Govindarajeswaran et al.

(10) Patent No.: US 9,100,292 B2
(45) Date of Patent: Aug. 4, 2015

(54) METHODS FOR MANAGING UPGRADING A TELECOMMUNICATION NETWORK AND DEVICES THEREOF

(71) Applicant: Wipro Limited, Bangalore (IN)

(72) Inventors: Maheshwaran Govindarajeswaran, Chennai (IN); Madanmohan Balasubramanian, Dindigul District (IN)

(73) Assignee: Wipro Limited, Bangalore (IN)

( * ) Notice: Subject to any disclaimer, the term of this patent is extended or adjusted under 35 U.S.C. 154(b) by 73 days.

(21) Appl. No.: 14/064,562

(22) Filed: Oct. 28, 2013

(65) Prior Publication Data
US 2015/0071082 A1 Mar. 12, 2015

(30) Foreign Application Priority Data
Sep. 10, 2013 (IN) .......................... 4043/CHE/2013

(51) Int. Cl.
*H04L 12/26* (2006.01)
*H04L 12/24* (2006.01)

(52) U.S. Cl.
CPC ............ *H04L 43/065* (2013.01); *H04L 41/082* (2013.01); *H04L 41/06* (2013.01); *H04L 41/0863* (2013.01)

(58) Field of Classification Search
CPC ....... H04L 43/00; H04L 43/06; H04L 43/065; H04L 43/08; H04L 43/0811; H04L 43/0823; H04L 43/12; H04L 43/14; H04L 41/082; H04L 41/085; G06F 8/665; G06F 8/67; G06F 8/68
See application file for complete search history.

(56) References Cited

U.S. PATENT DOCUMENTS

| | | | |
|---|---|---|---|
| 5,996,001 A * | 11/1999 | Quarles et al. | 709/203 |
| 6,061,735 A * | 5/2000 | Rogers | 709/239 |
| 6,230,194 B1 * | 5/2001 | Frailong et al. | 709/220 |
| 7,266,819 B2 | 9/2007 | Helgesen et al. | |
| 2008/0189693 A1 * | 8/2008 | Pathak | 717/168 |
| 2011/0182341 A1 | 7/2011 | Mishra et al. | |
| 2011/0314464 A1 | 12/2011 | Lee et al. | |
| 2013/0074061 A1 | 3/2013 | Averbuch et al. | |
| 2013/0125107 A1 * | 5/2013 | Bandakka et al. | 717/171 |

FOREIGN PATENT DOCUMENTS

EP 2448175 A1 2/2012

* cited by examiner

*Primary Examiner* — Curtis A Alia
(74) *Attorney, Agent, or Firm* — LeClairRyan, a Professional Corporation

(57) ABSTRACT

A method, non-transitory computer readable medium and upgrade management computing device for managing upgrade in a telecommunication network comprising identifying one or more telecommunication network elements which are currently active. A type, a subnet and one or more network topologies is identified for each of the identified active one or more telecommunication network elements. The identified active one or more telecommunication network elements is upgraded with one or more available upgrades based on the identified type, the subnet and the one or more network topologies. During the upgrading, the identified active one or more telecommunication network elements is monitored for occurrence of one or more errors. One or more reports are generated based on the monitoring.

21 Claims, 4 Drawing Sheets

METHODS FOR MANAGING UPGRADING A TELECOMMUNICATION NETWORK AND DEVICES THEREOF

This application claims the benefit of Indian Patent Application Filing Number 4043/CHE/2013, filed on Sep. 10, 2013, which is hereby incorporated by reference in its entirety.

FIELD

This technology relates to methods for managing upgrading in a telecommunication network and devices thereof.

BACKGROUND

Telecommunication network management refers to the activities, methods, procedures, and tools that pertain to the operation, administration, maintenance, and provisioning of telecommunication networked systems. These telecommunication networked systems include a number of interconnected telecommunication network elements which perform various functions including routing of messages, assisting in multimedia telephony among many others. Presently, telecommunication network traffic is increasing rapidly and accordingly, the number of telecommunication network elements also is increasing making the process of managing these telecommunication network elements extremely important and more challenging.

One of the most important challenging aspects of managing these telecommunication network elements is with managing any necessary upgrade, particularly any software upgrade. Unfortunately, some network telecommunication network elements are difficult to reach and as a result are missing important upgrades. Further, if an error does occur during an upgrade process, existing technologies are unable to automatically recover and implement the recovery plan.

SUMMARY

A method for managing upgrade in a telecommunication network includes an upgrade management computing device identifying one or more telecommunication network elements which are currently active. A type, a subnet, and one or more network topologies is identified by the upgrade management computing device for each of the identified active one or more telecommunication network elements. The identified active one or more telecommunication network elements are upgraded by the upgrade management computing device with one or more available upgrades based on the identified type, the identified subnet and the identified one or more network topologies. During the upgrading, the upgrade management computing device monitors the identified active one or more telecommunication network elements for occurrence of one or more errors. One or more reports are generated by the upgrade management computing device based on the monitoring.

A non-transitory computer readable medium having stored thereon instructions for managing upgrade in a telecommunication network comprising machine executable code which when executed by at least one processor, causes the processor to perform steps including identifying one or more telecommunication network elements which are currently active. A type, a subnet, and one or more network topologies is identified by the upgrade management computing device for each of the identified active one or more telecommunication network elements. The identified active one or more telecommunication network elements are upgraded by the upgrade management computing device with one or more available upgrades based on the identified type, the identified subnet and the identified one or more network topologies. During the upgrading, the upgrade management computing device monitors the identified active one or more telecommunication network elements for occurrence of one or more errors. One or more reports are generated by the upgrade management computing device based on the monitoring.

An upgrade management computing device comprising one or more processors, a memory, wherein the memory coupled to the one or more processors which are configured to execute programmed instructions stored in the memory including identifying one or more telecommunication network elements which are currently active. A type, a subnet, and one or more network topologies is identified by the upgrade management computing device for each of the identified active one or more telecommunication network elements. The identified active one or more telecommunication network elements are upgraded by the upgrade management computing device with one or more available upgrades based on the identified type, the identified subnet and the identified one or more network topologies. During the upgrading, the upgrade management computing device monitors the identified active one or more telecommunication network elements for occurrence of one or more errors. One or more reports are generated by the upgrade management computing device based on the monitoring.

This technology provides a number of advantages including providing more effective methods, non-transitory computer readable medium and devices for managing upgrading within telecommunication and other types of networks. The technology also provides advantages of an adaptable upgrading of telecommunication network elements by either automatically recovering from the upgrade error(s) or automatically correcting the upgrade error(s). Additionally, by effectively selecting the network gateways based on fault and performance and then determining an upgrade plan for the telecommunication network element based on a reachability index, the technology disclosed avoids network isolation. Furthermore, the technology provides mechanism for automatic recovery of the upgrade plan when there are errors during the upgrading process, thereby minimizing the interaction with a network administrator.

DETAILED DESCRIPTION

Figure 1:
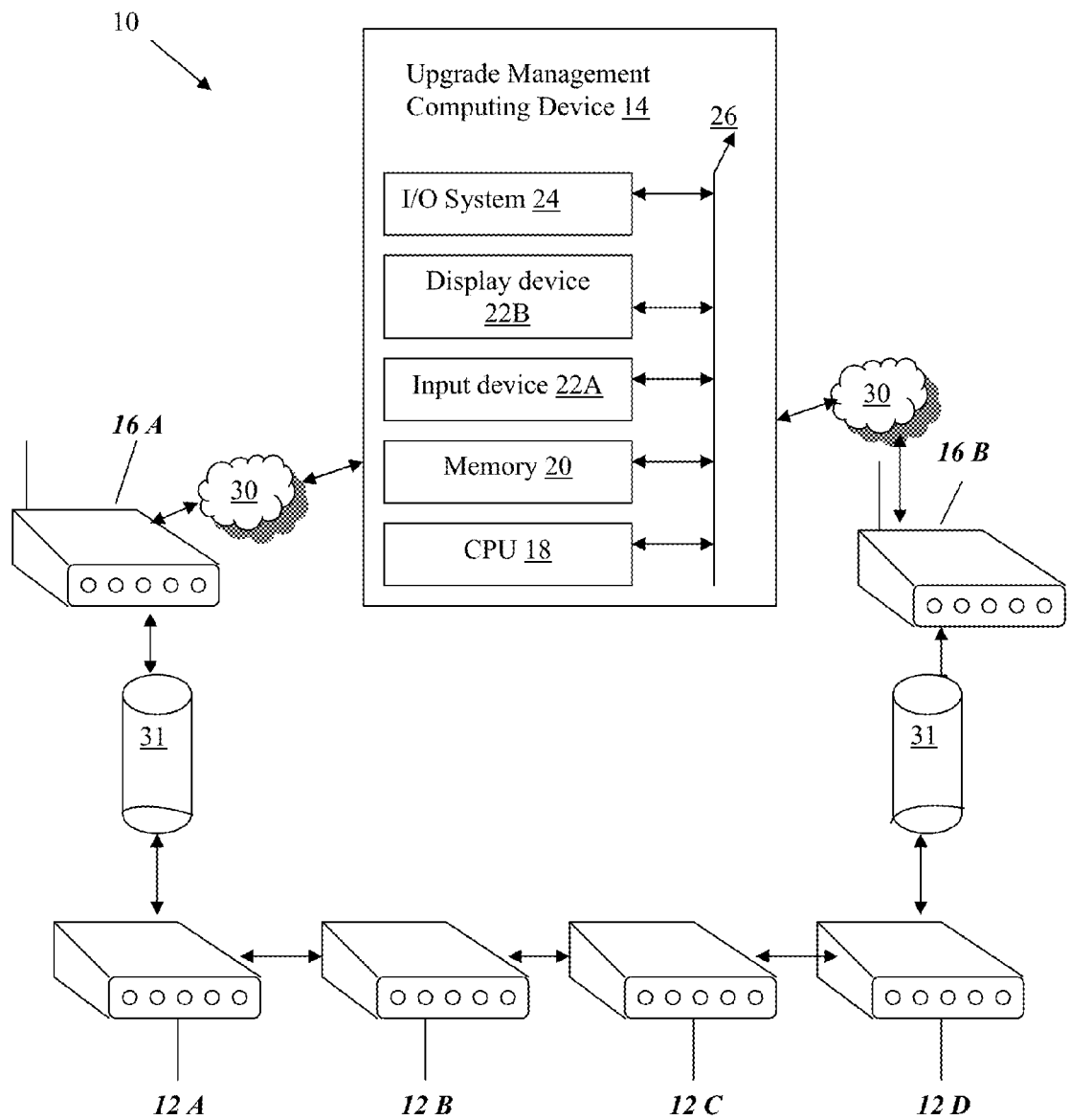
FIG. 1 is an exemplary telecommunication network environment which comprises a upgrade management computing device for managing upgrading.

An exemplary telecommunications network environment 10 with an upgrade management computing device 14 for managing upgrading is as illustrated in FIG. 1. The exemplary telecommunications network environment 10 includes a plurality of telecommunication network elements 12(A)-12(D), the upgrade management computing device 14, and a plurality of network gateways 16(A)-16(B) which are coupled together by the communication networks 30 and a secured private network 31, although the environment can include other types and numbers of devices, components, elements and communication networks in a variety of other topologies and deployments. While not shown, the exemplary environment 10 may include additional components, such as routers, switches and other devices which are well known to those of ordinary skill in the art and thus will not be described here. This technology provides a number of advantages including providing more effective methods, non-transitory computer readable medium and devices for managing upgrading in telecommunication and other types of networks.

Referring more specifically to FIG. 1, upgrade management computing device 14 interacts with the network gateways 16(A)-16(B) through the communication networks 30 and the network gateways 16(A)-16(B) interacts with telecommunication network elements 12(A)-12(D) through the secured private network 31, although the upgrade management computing device 14 can interact with the telecommunication network elements 12(A)-12(D) and the network gateways 16(A)-16(B) using other methods or techniques. Communication networks 30 and the secured private network 31 include local area networks (LAN), wide area network (WAN), 3G technologies, GPRS or EDGE technologies, although the communication networks 30 can include other types and numbers of networks and other network topologies.

The upgrade management computing device 14 manages upgrading within a telecommunications network environment 10 as illustrated and described with the examples herein, although upgrade management computing device 14 may perform other types and numbers of functions and in other types of networks. The upgrade management computing device 14 includes at least one processor 18, memory 20, input device 22A and display device 22B, and input/output (I/O) system 24 which are coupled together by bus 26, although upgrade management computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2A:
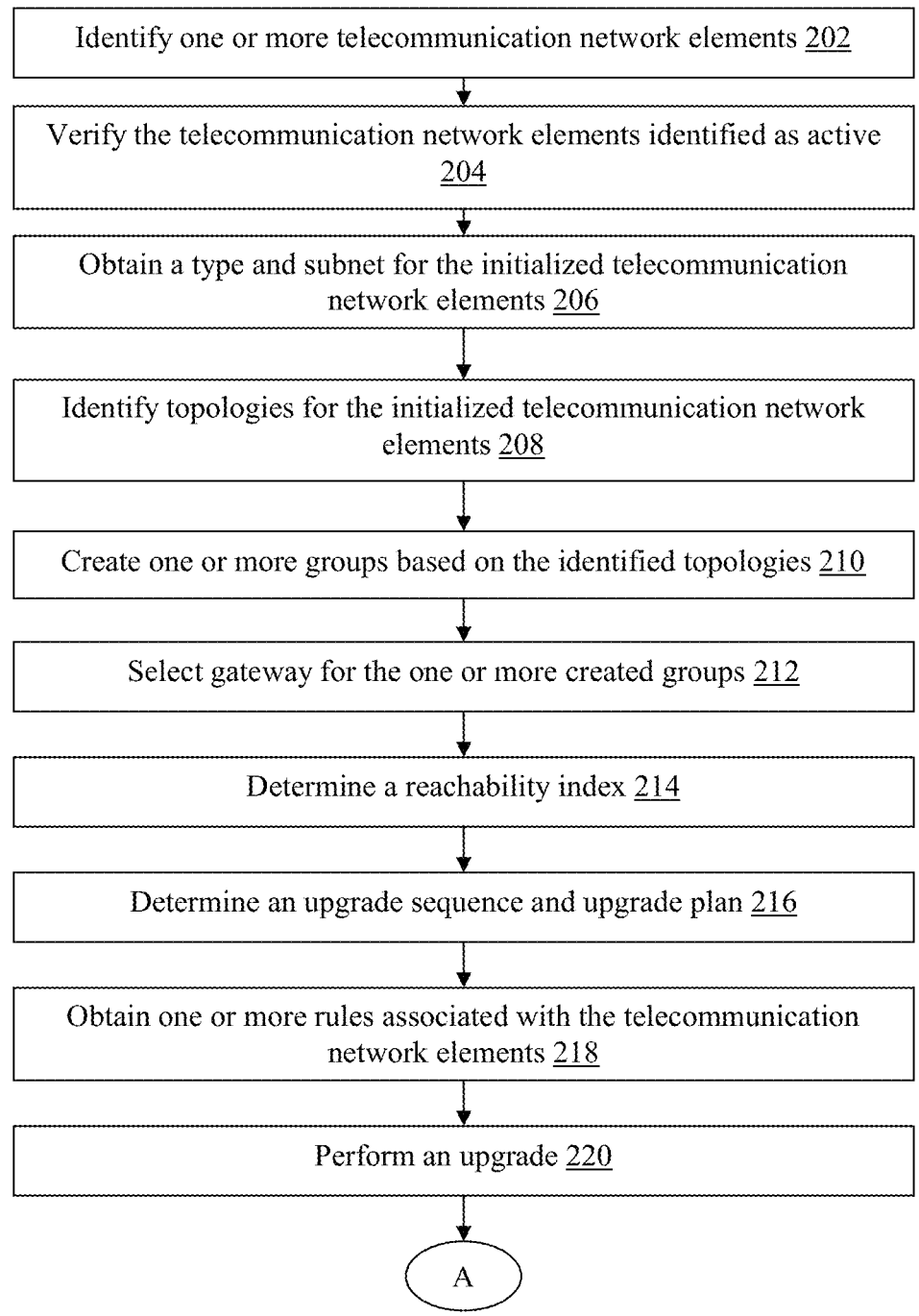
FIGS. 2A-2C are flowcharts of an exemplary method for managing upgrade in a telecommunication network.
Figure 2B:
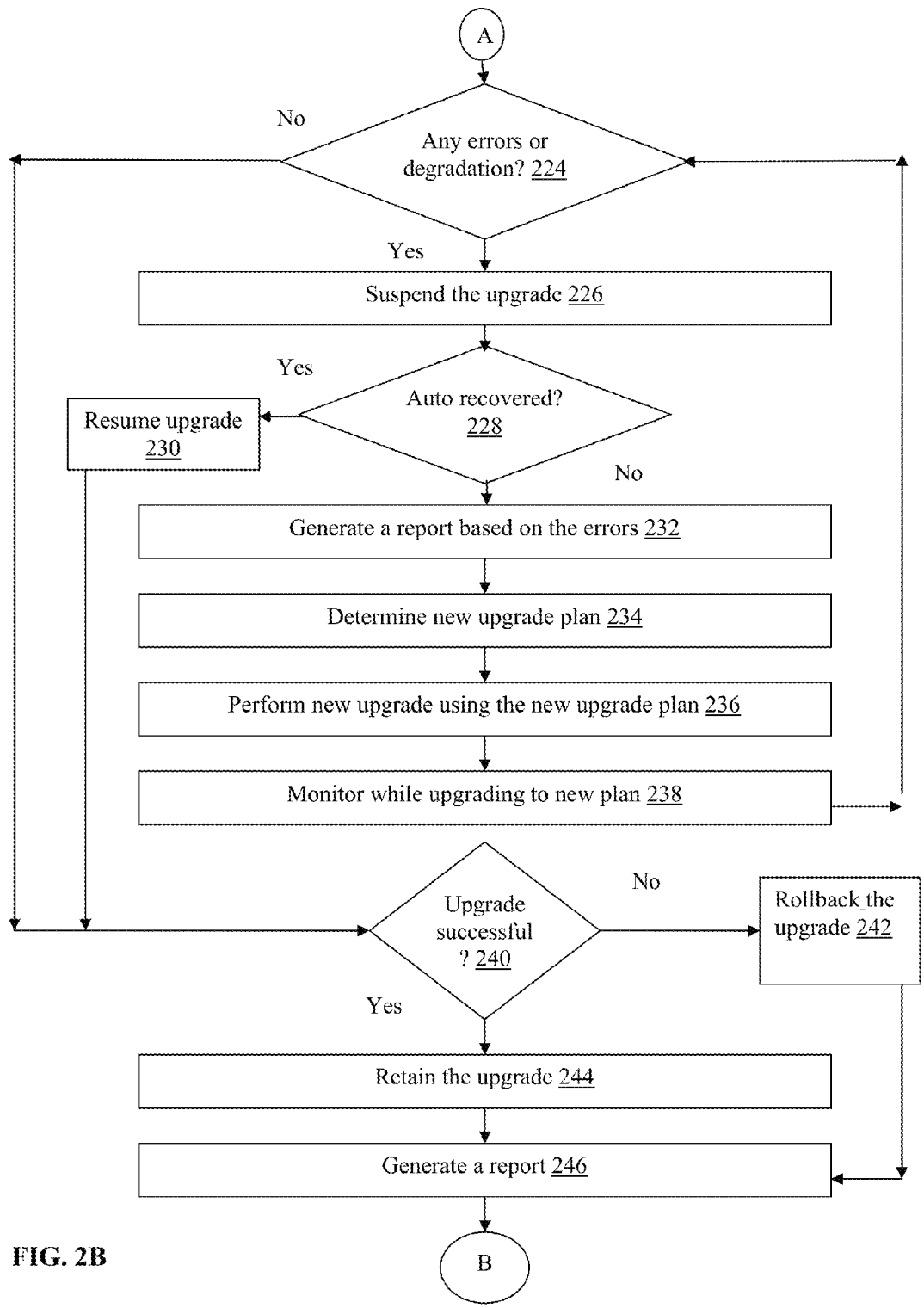
Figure 2C:
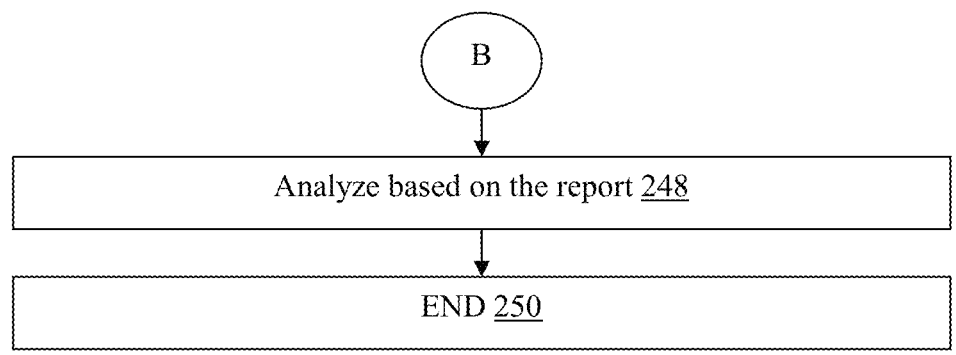

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more programmed instructions of this technology as illustrated and described with reference to the examples herein that may be executed by the one or more processor(s) 18. The flow charts shown in FIGS. 2A-2C are representative of example steps or actions of this technology that may be embodied or expressed as one or more non-transitory computer or machine readable having stored instructions stored in memory 20 that may be executed by the processor(s) 18.

Input device 22A enables a user, such as an administrator, to interact with the upgrade management computing device 14, such as to input and/or view data and/or to configure, program and/or operate it by way of example only. By way of example only, input device 22A may include one or more of a touch screen, keyboard and/or a computer mouse.

The display device 22B enables a user, such as an administrator, to interact with the upgrade management computing device 14, such as to view and/or input information and/or to configure, program and/or operate it by way of example only. By way of example only, the display device 22B may include one or more of a CRT, LED monitor, LCD monitor, or touch screen display technology although other types and numbers of display devices could be used.

The I/O system 24 in the upgrade management computing device 14 is used to operatively couple and communicate between the upgrade management computing device 14, the network gateways 16(A)-16(B) and which are all coupled together by communication network 30. In this example, the bus 26 is a hyper-transport bus in this example, although other bus types and links may be used, such as PCI.

Each of the telecommunication network elements 12(A)-12(D) includes a central processing unit (CPU) or processor, a memory, an interface device, and an I/O system, which are coupled together by a bus or other link, although other numbers and types of network devices could be used. Each of the telecommunication network elements 12(A)-12(D) communicate with the upgrade management computing device 14 through the network gateways 16(A)-16(B), although the telecommunication network elements 12(A)-12(D) can interact with the upgrade management computing device 14 by other techniques. Additionally, in this example, the telecommunication network elements 12(A)-12(D) interacts with the network gateways 16(A)-16(B) through the private secured network 31 such as a VPN, although the telecommunication network elements 12(A)-12(D) can interact with the network gateways 16(A)-16(B) via other network topologies such as semi-private or public topology.

The network environment 10 also includes plurality of network gateways 16(A)-16(B). Each of the plurality of network gateways 16(A)-16(B) includes a central processing unit (CPU) or processor, a memory, an interface device, and an I/O system, which are coupled together by a bus or other link, although other numbers and types of network devices could be used. Each of the plurality of network gateways 16(A)-16(B) communicate with the upgrade management computing device 14 through communication network 30, although the network gateways 16(A)-16(B) can interact with the upgrade management computing device 14 by other techniques.

Although an exemplary telecommunications network environment 10 with the multiple telecommunication network elements 12(A)-12(D), upgrade management computing device 14 and multiple network gateways 16(A)-16(B) are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for managing upgrade in a telecommunication network will now be described with reference to FIGS. 1-2C. In step 202, the upgrade management computing device 14 identifies in this example which of the telecommunication network elements 12(A)-12(D) are active and available for a software upgrade, although other manners of identifying active network elements can be used and the upgrade management computing device 14 may perform other types of upgrades.

Next in step 204, the upgrade management computing device 14 verifies the telecommunication network elements 12(A)-12(D) which have been identified as active. In this example, the upgrade management computing device 14 verifies the telecommunication network elements 12(A)-12(D) identified as active by checking for connection of the identified telecommunication network elements 12(A)-12(D). By way of example only, the upgrade management computing device 14 can try to establish and verify a connection with each of the telecommunication network elements 12(A)-12(D) identified as active using the internet protocol address (IP Address) of the identified telecommunication network elements 12(A)-12(D) via any of the network gateways 16(A)-16(B), although the upgrade management computing device 14 can use other techniques to verify each connection. In this example, the telecommunication network elements 12(A)-12(D) are verified as active for purpose of further illustration.

Once the upgrade management computing device 14 has established and verified a connection with the telecommunication network elements 12(A)-12(D) identified as active) via any of the network gateways 16(A)-16(B), the upgrade management computing device 14 also obtains vendor data associated with the telecommunication network elements 12(A)-12(D) from a vendor database (not shown). By way of example only, the vendor data can include the type, model, year of manufacturing, images of each of the telecommunication network elements and this the vendor data can be stored in memory 20, although the vendor data can include other types of information associated with one or more of the telecommunication network elements 12(A)-12(D) and can be stored in other locations.

Next, in step 206, the upgrade management computing device 14 obtains subnets of each of the telecommunication network elements 12(A)-12(D) from the verified telecommunication network elements 12(A)-12(D), although the upgrade management computing device 14 can obtain the subnets using other techniques. In another example, the upgrade management computing device 14 obtains the subnets for each of the telecommunication network elements 12(A)-12(D) with verified connections by displaying a form of the identified telecommunication network elements 12(A)-12(D) on the display device 22B and requesting the network administrator to enter the subnets using the input device 22A in fields on the form.

In step 208, the upgrade management computing device 14 identifies the topology of each of the telecommunication network elements 12(A)-12(D) with verified connections using the IP address of each along with the established and verified connection obtained back in step 204, although the upgrade management computing device 14 can use other techniques to identify the topology of each of the telecommunication network elements. In this example, the upgrade management computing device 14 identifies similar topologies by the number of hops taken to reach a particular telecommunication network element of the plurality of the telecommunication network elements 12(A)-12(D), although the upgrade management computing device 14 can identify the topology using other parameters or techniques. By way of example only, the upgrade management computing device can reach telecommunication network element 12(A) by one hop, telecommunication network element 12(B) by two hops (first hop to telecommunication network element 12(A) and second hop to telecommunication network element 12(B)) and similarly, telecommunication network element 12(C) by three hops and telecommunication network element 12(D) by four hops via the network gateway 16(A). Accordingly, based on these hops, the upgrade management computing device 14 can identify the topology of each of the telecommunication network elements 12(A)-12(D), although other techniques or parameters can be used to identify the topology.

In step 210, the upgrade management computing device 14 creates one or more groups among the identified telecommunication network elements 12(A)-12(D) based on the one or more identified topologies in step 204. In this example, the upgrade management computing device 14 groups the telecommunication network element having a similar topology, although the upgrade management computing device 14 can group the telecommunication network elements 12(A)-12(D) using other parameters or techniques. By way of example only, the upgrade management computing device 14 can group telecommunication network elements 12(A) and 12(B) together for having a similar kind of topology into group 1; and can group telecommunication network elements 12(C) and 12(D) for having similar kind of topology into group 2.

With reference to step 212, the upgrade management computing device 14 selects a gateway for each of the one or more created groups in step 210. In this example, the upgrade management computing device 14 selects a gateway for each of the one or more created groups based on fault and performance related data of all the available network gateways 16(A)-16(B), although the upgrade management computing device 14 can select the gateway using other parameters or techniques. By way of example only, the upgrade management computing device 14 obtains the fault and performance from each of the network gateways 16(A)-16(B). Based on the obtained fault and performance data of the network gateways 16(A)-16(B), the upgrade management computing device 14 computes a stability factor for each of the network gateways 16(A)-16(B). In this example, the stability factor of network gateway 16(A) is higher than the stability factor of the network gateway 16(B). Using the computed stability factor, the upgrade management computing device 14 selects the appropriate gateway for the previously created group by comparing the stability factor of the gateway with the obtained fault and performance data of the telecommunication network elements 16(A)-16(D) within the group, although the stability factor of the gateway can be compared with types and numbers of other parameters associated with the telecommunication network elements 16(A)-16(D). After comparing the computed stability factor and the parameters of the telecommunication network elements 16(A)-16(D), the upgrade management computing device 14 selects a gateway with the highest stability factor for the created group having higher expected load factor, number of critical alarms, by way of example, although the upgrade management computing device 14 can select the gateway using other parameters or techniques. By way of example only, the upgrade management computing device 14 selects network gateway 16(A) for group 1 and selects network gateway 16(B) for group 2.

Next, in step 214, the upgrade management computing device 14 determines a reachability index for each of the telecommunication network elements 12(A)-12(D) in group 1 and group 2 via the network gateways 16(A)-16(B), although the reachability index can be determined using other techniques. In this example, the reachability index is a value assigned to the telecommunication network elements 12(A)-

12(D) indicating the distance of the telecommunication network elements 12(A)-12(D) from the network gateways 16(A)-16(B). Accordingly in this example, the telecommunication network elements 12(A)-12(D) will have a smaller reachability index when it is near the network gateways 16(A)-16(B) and a higher reachability index when it is further away from the network gateways 16(A)-16(B). In this particular example, a lower value for the reachability index indicates a better chance of successfully completing the upgrade on the telecommunication network element. By way of example only, a reachability index of telecommunication network element 12(A) from network gateway 16(A) is 10, a reachability index of telecommunication network element 12(B) from network gateway 16(A) is 20, a reachability index of telecommunication network element 12(C) from network gateway 16(A) is 30 and a reachability index of telecommunication network element 12(D) from network gateway 16(A) is 40. Similarly, a reachability index of telecommunication network element 12(A) from network gateway 16(B) is 40, a reachability index of telecommunication network element 12(B) from network gateway 16(B) is 30, a reachability index for telecommunication network element 12(C) from network gateway 16(B) is 20 and a reachability index for telecommunication network element 12(D) from network gateway 16(B) is 10. In this example, the upgrade management computing device 14 chooses to manage the upgrades of telecommunication network elements 12(A)-12(D) via the network gateway 16(A) because network gateway 16(A) has a higher stability factor than the network gateway 16(B).

Using the reachability index and the stability factor of the network gateways 16(A)-16(B), in step 216 the upgrade management computing device 14 determines a plan and a sequence of upgrading the telecommunication network elements 12(A)-12(D), although the upgrade management computing device 14 can determine the plan and the sequence of upgrade using other types and numbers of parameters. In this example, the upgrade management computing device 14 determines to start the upgrade sequence and plan from the network gateway 16(A)-16(B) with the highest stability factor and then with the telecommunication network elements 12(A)-12(D) with the highest reachability index and then sequentially proceed through the telecommunication network elements 12(A)-12(D) having a lower reachability index, although the upgrade management computing device 14 can use other techniques to determine a plan and sequence of upgrading. Accordingly in this example, the upgrade plan and sequence would be to first upgrade telecommunication network element 12(D) and then telecommunication network element 12(C), then proceed to upgrade the telecommunication network element 12(B) and then finally to telecommunication network element 12(A) via the network gateway 16(A).

Next, in step 218 the upgrade management computing device 14 obtains an upgrade rule for each of the telecommunication network elements 12(A)-12(D) from within the memory 20, although the upgrade management computing device 14 can obtain one or more upgrade rules from other location, such as a rule database (not shown). In this example, the memory 20 includes a table having a list of different types of telecommunication network element and the one or more rules corresponding with each telecommunication network element, although the table can include other types and amounts of information. Accordingly, in this example, the upgrade management computing device 14 obtains the corresponding upgrade rule for each of the telecommunication network element 12(A)-12(D), where the type of each telecommunication network element was initially obtained back in step 204. Additionally, in this example, upgrade rule relates to a particular procedure to upgrade a particular telecommunication network element, although the upgrade rule can include other types and amounts of information.

In step 220, the upgrade management computing device 14, using the upgrade sequence and plan determined in step 216 and the obtained upgrade rule in step 218 performs a software upgrade on each of the telecommunication network element 12(A)-12(D), although the upgrade management computing device 14 can perform an upgrade using other parameters.

In step 224, the upgrade management computing device 14 monitors the upgrade any error(s) in the upgrading or degradation of the upgrade. If the upgrade management computing device 14 does not identify any error(s) or degradation, then a No branch is taken to step 240. However, if the upgrade management computing device 14 determines an error(s) or degradation of the upgrade, then a Yes branch is taken to step 226. By way of example, the upgrade error(s) or degradation of the upgrade can be caused by a loss of connection to the one of the telecommunication network elements 12(A)-12(D) receiving the upgrade or with the network gateways 16(A)-16(B), an inability to upgrade based on the obtained rule, a failure during the implementation of the determined upgrade sequence or plan, although other types and numbers of upgrade error(s) or upgrade degradation could occur.

In step 226, the upgrade management computing device 14 temporarily suspends the upgrade on the telecommunication network elements 12(A)-12(D) when the upgrade management computing device 14 determines an upgrade error(s) or degradation of the upgrade has occurred, although other actions could be taken. By way of example only, the upgrade management computing device 14 could choose to suspend the upgrade only on a particular telecommunication network element having the upgrade error(s) or degradation and continue to upgrade the other telecommunication network elements. Alternatively, in another example, the upgrade management computing device 14 may terminate the upgrade process on all of the telecommunication network elements 12(A)-12(D) or only the telecommunication network elements present within the group of telecommunication network element which encountered the upgrade error(s) or degradation.

Next, in step 228, the upgrade management computing device 14 determines if the upgrade error(s) or degradation of the upgrade could be automatically recovered or corrected. If the upgrade management computing device 14 determines that the upgrade error(s) or degradation could be automatically recovered or corrected, then a Yes branch is taken to step 230, where the upgrade process is continued from the point of temporary suspension. However, if the upgrade management computing device 14 determines that the upgrade error(s) or degradation of the upgrade could not be automatically recovered or corrected, then a No branch is taken to step 232. In this example, the upgrade management computing device 14 tries to automatically recover or correct from the upgrade error(s) or upgrade degradation without any input from the network administrator by trying to repeatedly connect to the telecommunication network element for a predetermined number of times when there is a loss of connection, although other manners for initiating the recovery or correction could be used. In another example, the upgrade management computing device 14 may again obtain vendor data, such as the telecommunication network element type, model from the vendor database (not shown), reobtain the corresponding upgrade rule, and then try the upgrade process again. In yet another example, the upgrade management computing device 14 may try to perform recovery of the upgrade on the telecommunication network element using another available network gateways.

In step 232, the upgrade management computing device 14 generates a report indicating the type of update error(s) or reason of the upgrade degradation, although the report can include other types or amounts of information. Optionally, the upgrade management computing device 14 may choose to provide a notification to a network administrator via the display device 22B indicating the error or availability of the report.

Next, in step 234, the upgrade management computing device 14 may determine a new upgrade plan to upgrade the telecommunication network elements 12(A)-12(D) which experienced an error or degradation that was not recoverable. By way of example only, the upgrade management computing device 14 may have a back-up or alternate upgrade plan for each type of upgrade error(s) or stored within the memory 20 and can use the corresponding upgrade plan as a new upgrade plan to upgrade the telecommunication network elements 12(A)-12(D) which had the unrecoverable error. In another example, the upgrade management computing device 14 provides the upgrade plan and sequence determined in step 216, the upgrade rule obtained in step 218 to a network administrator via the display device 22B which inputs a new upgrade plan via the input device 22A for implementation, although the upgrade management computing device 14 can determine a new upgrade plan using other techniques.

In step 236, the upgrade management computing device 14 may execute the new upgrade to the telecommunication network elements 12(A)-12(D) with the unrecoverable error using the new upgrade plan determined in step 234.

While upgrading the telecommunication network elements 12(A)-12(D) using the new upgrade plan, in step 238, the upgrade management computing device 14 continues to monitor the upgrade process in real-time to identify any new upgrade error(s) or degradation of the upgrade as previously illustrated and described in step 224. Accordingly, in this example, steps 224 to 238 may be repeated until the upgrade is successful.

In step 240, the upgrade management computing device 14 determines if the upgrade has been successfully completed for each of the telecommunication network elements 12(A)-12(D). If the upgrade management computing device 14 determines that the upgrade has not been successfully completed for each of the telecommunication network elements 12(A)-12(D), then a No branch is taken to step 242 where the upgrade performed on the telecommunication network elements 12(A)-12(D) is removed or rolled back. However, if the upgrade management computing device 14 determines that the upgrade has been completed successfully, then a Yes branch is taken to step 244. In this example, for the upgrade to have completed successfully, the upgrade management computing device 14 determines if all the telecommunication network elements 12(A)-12(D) identified in step 202 has been completed with the most recent version of the available software, although the upgrade management computing device 14 can check for other parameters.

In step 244, the upgrade management computing device 14 retains by not deleting or rolling back the upgrade on each of the telecommunication network elements 12(A)-12(D) indicating a successful upgrade.

Next, in step 246, the upgrade management computing device 14 generates a report on the status of the upgrade(s) on the telecommunication network elements 12(A)-12(D). Additionally, the upgrade management computing device 14 provides all the reports generated during the exemplary steps of 202-246 by displaying the reports on the display device 22B, although the upgrade management computing device 14 can provide the reports using other techniques. By providing all the reports generated, the network administrator using the upgrade management computing device 14 can get an overall summary of the upgrade error(s) which were determined if any, steps taken to automatically correct the upgrade error(s) if any and finally the confirmation indicating the completion of the upgrade on the telecommunication network elements 12(A)-12(D).

In step 248, the network administrator of the upgrade management computing device 14 can analyze the upgrade process using the reports provided by the upgrade management computing device 14. By way of example only, the network administrator may use these reports to plan any future upgrades on the telecommunication network elements 12(A)-12(D) and reduce any possible upgrade error(s) in the future upgrades, although the provided reports can be used for other purposes assisting with managing upgrade of the telecommunication network elements 12(A)-12(D) and the exemplary process ends in step 250.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing upgrade in a telecommunication network, the method comprising:

identifying, by an upgrade management computing device, one or more telecommunication network elements which are currently active;

identifying, by the upgrade management computing device, a type, a subnet and one or more network topologies for each of the identified active one or more telecommunication network elements;

creating, by the upgrade management computing device, one or more groups for the identified active one or more telecommunication network elements based on the identified one or more network topologies;

computing, by the upgrade management computing device, a stability factor of each of one or more gateways based on fault and performance related data of each of the one or more gateways;

obtaining, by the upgrade management computing device, fault and performance related parameters associated with each of the one or more groups;

comparing, by the upgrade management computing device, the stability factor of each of the one or more gateways with obtained fault and performance related parameters associated with each of the one or more groups;

selecting, by the upgrade management computing device, a gateway for each of the created one or more groups based on the comparing;

upgrading, by the upgrade management computing device via a corresponding selected gateway, each of the created one or more groups for the identified active one or more telecommunication network elements with one or more available upgrades based on the identified type, the subnet and the one or more network topologies;

monitoring, by the upgrade management computing device, during the upgrading of one or more of the identified active one or more telecommunication network elements for occurrence of one or more errors; and generating, by the upgrade management computing device, one or more reports based on the monitoring.

2. The method as set forth in claim 1 further comprising:
determining, by the upgrade management computing device, a reachability index for each of the identified active one or more telecommunication network elements within each of the created one or more groups based on the obtained gateway; and determining, by the upgrade management computing device, an upgrade sequence and an upgrade plan for each of the identified active one or more telecommunication network elements within each of the created one or more groups based on the identified one or more network topologies and the determined reachability index.

3. The method as set forth in claim 1 wherein the upgrading further comprises:
obtaining, by the upgrade management computing device, one or more rules associated with the identified active one or more telecommunication network elements; and upgrading, by the upgrade management computing device, the identified active one or more telecommunication network elements based on the obtained one or more rules.

4. The method as set forth in claim 1 further comprising analyzing, by the upgrade management computing device, one or more of the generated reports to identify a cause of the determined one or more errors.

5. The method as set forth in claim 1 wherein the monitoring further comprises:
suspending, by the upgrade management computing device, the upgrading on each of the identified active one or more telecommunication network elements when one or more errors are determined to have occurred; and notifying, by the upgrade management computing device, when the one or more errors are determined to have occurred.

6. The method as set forth in claim 1 wherein the monitoring further comprises:
identifying, by the upgrade management computing device, one or more network changes in the one or more network topologies during the upgrading of one or more of the identified active one or more telecommunication network elements; and determining, by the upgrade management computing device, a new upgrade plan for each of the identified active one or more telecommunication network elements based on the identified one or more network changes; and adapting, by the upgrade management computing device, the upgrading by performing a new upgrade for each of the identified active one or more telecommunication network elements based on the determined new upgrade plan.

7. The method as set forth in claim 1 further comprising:
determining, by the upgrade management computing device, for a successful completion of the upgrading one or more of the identified active one or more telecommunication network elements;

retaining, by the upgrade management computing device, the upgrading on one or more of the identified active one or more telecommunication network elements when the successful completion has been determined; and removing, by the upgrade management computing device, the upgrading on one or more of the identified active one or more telecommunication network elements when the successful completion has not been determined.

8. A non-transitory computer readable medium having stored thereon instructions for managing upgrade in a telecommunication network comprising machine executable code which when executed by at least one processor, causes the processor to perform steps comprising:
identifying, one or more telecommunication network elements which are currently active;

identifying, a type, a subnet and one or more network topologies for each of the identified active one or more telecommunication network elements;

creating one or more groups for the identified active one or more telecommunication network elements based on the identified one or more network topologies;

computing a stability factor of each of one or more gateways based on fault and performance related data of each of the one or more gateways;

obtaining fault and performance related parameters associated with each of the one or more groups;

comparing the stability factor of each of the one or more gateways with obtained fault and performance related parameters associated with each of the one or more groups;

selecting a gateway for each of the created one or more groups based on the comparing;

upgrading via a corresponding selected gateway, each of the created one or more groups for the identified active one or more telecommunication network elements with one or more available upgrades based on the identified type, the subnet and the one or more network topologies;

monitoring, during the upgrading of one or more of the identified active one or more telecommunication network elements for occurrence of one or more errors; and generating, one or more reports based on the monitoring.

9. The medium as set forth in claim 8 further comprising: determining, a reachability index for each of the identified active one or more telecommunication network elements within each of the created one or more groups based on the obtained gateway; and determining, an upgrade sequence and an upgrade plan for each of the identified active one or more telecommunication network elements within each of the created one or more groups based on the identified one or more network topologies and the determined reachability index.

10. The medium as set forth in claim 8 wherein the upgrading further comprises:
obtaining, one or more rules associated with the identified active one or more telecommunication network elements; and upgrading, the identified active one or more telecommunication network elements based on the obtained one or more rules.

11. The medium as set forth in claim 8 further comprising analyzing, one or more of the generated reports to identify a cause of the determined one or more errors.

12. The medium as set forth in claim 8 wherein the monitoring further comprises:

suspending, the upgrading on each of the identified active one or more telecommunication network elements when one or more errors are determined to have occurred; and notifying, when the one or more errors are determined to have occurred.

13. The medium as set forth in claim 8 wherein the monitoring further comprises:

identifying, one or more network changes in the one or more network topologies during the upgrading of one or more of the identified active one or more telecommunication network elements; and determining, a new upgrade plan for each of the identified active one or more telecommunication network elements based on the identified one or more network changes; and adapting, the upgrading by performing a new upgrade for each of the identified active one or more telecommunication network elements based on the determined new upgrade plan.

14. The medium as set forth in claim 8 further comprising:

determining, for a successful completion of the upgrading one or more of the identified active one or more telecommunication network elements;

retaining, the upgrading on one or more of the identified active one or more telecommunication network elements when the successful completion has been determined; and removing, the upgrading on one or more of the identified active one or more telecommunication network elements when the successful completion has not been determined 15. An upgrade management computing device comprising:

one or more processors;

a memory, wherein the memory coupled to the one or more processors which are configured to execute programmed instructions stored in the memory comprising:

identifying, one or more telecommunication network elements which are currently active;

identifying, a type, a subnet and one or more network topologies for each of the identified active one or more telecommunication network elements;

creating, one or more groups for the identified active one or more telecommunication network elements based on the identified one or more network topologies;

computing a stability factor of each of one or more gateways based on fault and performance related data of each of the one or more gateways;

obtaining fault and performance related parameters associated with each of the one or more groups;

comparing the stability factor of each of the one or more gateways with obtained fault and performance related parameters associated with each of the one or more groups;

selecting a gateway for each of the created one or more groups based on the comparing;

upgrading, via a corresponding selected gateway, each of the created one or more groups for the identified active one or more telecommunication network elements with one or more available upgrades based on the identified type, the subnet and the one or more network topologies;

monitoring, during the upgrading of one or more of the identified active one or more telecommunication network elements for occurrence of one or more errors; and generating, one or more reports based on the monitoring.

16. The device as set forth in claim 15 wherein the one or more processors is further configured to execute programmed instructions stored in the memory further comprising:

determining, a reachability index for each of the identified active one or more telecommunication network elements within each of the created one or more groups based on the obtained gateway; and determining, an upgrade sequence and an upgrade plan for each of the identified active one or more telecommunication network elements within each of the created one or more groups based on the identified one or more network topologies and the determined reachability index.

17. The device as set forth in claim 15 wherein the one or more processors is further configured to execute programmed instructions stored in the memory for the upgrading further comprises:

obtaining, one or more rules associated with the identified active one or more telecommunication network elements; and upgrading, the identified active one or more telecommunication network elements based on the obtained one or more rules.

18. The device as set forth in claim 15 wherein the one or more processors is further configured to execute programmed instructions stored in the memory further comprising analyzing, one or more of the generated reports to identify a cause of the determined one or more errors.

19. The device as set forth in claim 15 wherein the one or more processors is further configured to execute programmed instructions stored in the memory for the monitoring further comprises:

suspending, the upgrading on each of the identified active one or more telecommunication network elements when one or more errors are determined to have occurred; and notifying, when the one or more errors are determined to have occurred.

20. The device as set forth in claim 15 wherein the one or more processors is further configured to execute programmed instructions stored in the memory for the monitoring further comprises:

identifying, one or more network changes in the one or more network topologies during the upgrading of one or more of the identified active one or more telecommunication network elements; and determining, a new upgrade plan for each of the identified active one or more telecommunication network elements based on the identified one or more network changes; and adapting, the upgrading by performing a new upgrade for each of the identified active one or more telecommunication network elements based on the determined new upgrade plan.

21. The device as set forth in claim 15 wherein the one or more processors is further configured to execute programmed instructions stored in the memory further comprising:

determining, for a successful completion of the upgrading one or more of the identified active one or more telecommunication network elements;

retaining, the upgrading on one or more of the identified active one or more telecommunication network elements when the successful completion has been determined; and removing, the upgrading on one or more of the identified active one or more telecommunication network elements when the successful completion has not been determined.

* * * * *